United States Patent
Kawaguchi (12) 
(10) Patent No.: US 6,359,698 B1
(45) Date of Patent: *Mar. 19, 2002

(54) PRINTING APPARATUS AND PRINTING CONTROL METHOD FOR PRINTING THE SMALLEST RECEIVED JOB FIRST

(75) Inventor: Tadashi Kawaguchi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 07/985,155

(22) Filed: Dec. 3, 1992

(30) Foreign Application Priority Data

Dec. 4, 1991 (JP) .............................. 3-320332

(51) Int. Cl.$^7$ ............................... G06K 15/00
(52) U.S. Cl. ..................... 358/1.16; 358/1.14
(58) Field of Search ................. 358/400, 404, 358/444, 467, 1.15, 1.16, 1.17, 1.18, 1.9, 1.13; 350/401, 442, 468, 444; 395/114, 115, 116, 117, 109, 112, 375, 275, 400, 670, 672, 673, 200.3, 200.31, 200.37; 347/19, 23, 54, 101, 104; 345/344, 352; 364/468.05, 468.06, 468.07, 468.08; 399/85, 87

(56) References Cited

U.S. PATENT DOCUMENTS

| | | | | | |
|---|---|---|---|---|---|
| 4,642,758 A | * | 2/1987 | Teng | ............................ | 707/10 |
| 4,829,468 A | * | 5/1989 | Nonaka et al. | ............. | 364/900 |
| 4,839,829 A | * | 6/1989 | Freedman | .................. | 364/519 |
| 4,841,373 A | * | 6/1989 | Asami et al. | ................ | 358/257 |
| 4,843,571 A | * | 6/1989 | Notermans et al. | ......... | 364/519 |
| 4,887,218 A | * | 12/1989 | Natarajan | .................. | 364/468 |
| 4,947,345 A | * | 8/1990 | Paradise et al. | ............ | 364/519 |
| 5,018,079 A | * | 5/1991 | Shukunami et al. | ........ | 364/519 |
| 5,036,361 A | * | 7/1991 | Filion et al. | ................... | 399/81 |
| 5,113,355 A | * | 5/1992 | Nomura | ...................... | 395/109 |
| 5,119,472 A | * | 6/1992 | Ogawa | ........................ | 395/111 |
| 5,216,754 A | * | 6/1993 | Sathi et al. | ................. | 395/113 |
| 5,303,336 A | * | 4/1994 | Kageyama et al. | ........ | 358/1.15 |
| 5,327,526 A | * | 7/1994 | Nomura et al. | ............. | 395/115 |
| 5,367,673 A | * | 11/1994 | Goldsmith et al. | ......... | 395/600 |
| 5,377,016 A | * | 12/1994 | Kashiwagi et al. | ......... | 358/403 |

FOREIGN PATENT DOCUMENTS

| | | | | | |
|---|---|---|---|---|---|
| EP | 0468762 | * | 7/1991 | .......... | G06F/15/00 |
| EP | 0469865 | * | 2/1992 | | |
| JP | 61196326 | * | 8/1986 | | |
| JP | 2-186428 | | 7/1990 | | |
| JP | 3-31968 | | 3/1991 | | |
| JP | 3-121527 | | 5/1991 | | |
| JP | 3-149617 | | 6/1991 | | |
| JP | 3-208121 | | 9/1991 | | |
| WO | WO8906024 | * | 6/1989 | | |

* cited by examiner

Primary Examiner—Garcia Gabriel
(74) Attorney, Agent, or Firm—Fitzpatrick, Cella, Harper & Scinto

(57) ABSTRACT

When data is received from a host computer A, a printing apparatus stores the received data in a reception buffer that has been segmented into memory blocks of a prescribed size. When one memory block is filled to capacity with the data received from host computer A, the printing apparatus determines whether there is a print request from another host computer. If there is a print request from a host computer other than host computer A, reception of the printing data accompanying this request is started and the data is stored in an unused memory block of the reception buffer. When this memory block is filled to capacity, reception of data from the host A is resumed. Thus, the printing apparatus receives data from a plurality of host computers concurrently and prints out data the reception of which has ended. By virtue of this arrangement, the printing apparatus is capable of deciding the order of printout based not only upon the order in which print requests occur but also upon the size of the data from each host computer.

18 Claims, 10 Drawing Sheets

PRINTING APPARATUS AND PRINTING CONTROL METHOD FOR PRINTING THE SMALLEST RECEIVED JOB FIRST

BACKGROUND OF THE INVENTION

1. Field of the Invention

This invention relates to a printing apparatus for printing data transferred from a plurality of host computers, by way of example.

2. Prior Art

When a plurality of host computers transfer print requests to the same printing apparatus substantially simultaneously in a conventional printing apparatus to which the plurality of host computers are connected, the printing apparatus processes the data from the host computer whose command arrives earliest. The data from another host computer whose print request has not yet been received starts undergoing printing processing following the end of the data processing (printout) executed first. Moreover, even after the data has been transferred to a buffer, the printing apparatus must wait until the end of the data has been detected and only then accepts the data from the host computer issuing the print request. As a consequence, even if the amount of data associated with a print request accepted subsequently is small and immediate printout is required, the length of waiting time is long and the processing efficiency of the overall system composed of the host computers and printing apparatus suffers.

SUMMARY OF THE INVENTION

Accordingly, an object of the present invention is to provide a printing apparatus in which data capable of being processed in a short period of time is processed preferentially in a case where print requests are issued simultaneously, thereby making it possible to raise the efficiency of the overall system which prints the data from an information source.

According to the present invention, the foregoing object is attained by providing a printing apparatus connected to a plurality of information sources for printing out data transferred from the information sources, comprising receiving means for receiving data from one of the plurality of information sources, memory means for segmenting the data, which has been received from the receiving means, into blocks of a prescribed size and storing the data block by block, changeover means for changing over the information source whenever one block of data is stored by the memory means, identifying means for identifying the information source of the data that has been stored block by block, and output means for outputting a block of data, which has been identified by the identifying means, from an information source identical with the information source for which reception of the data by the receiving means has ended.

In a preferred embodiment, the memory means decides the size of a stored block based upon the time necessary for reception.

In a preferred embodiment, the memory means decides the size of a stored block based upon the capacity of a memory medium necessary for storage.

In another aspect of the invention, there is provided a printing apparatus connected to a plurality of information sources for printing out data transferred from the information sources, comprising receiving means for receiving the sizes of the data from the information sources in advance, and comparison means for comparing the sizes of the data, wherein data determined to have the smallest size based upon the comparison performed by the comparison means is received and printed out.

Further, according to the present invention, there is provided a printing control method for a printing apparatus connected to a plurality of information sources for printing out data transferred from the information sources, comprising a receiving step of receiving data from one of the plurality of information sources, a storing step of segmenting the data, which has been received at the receiving step, into blocks of a prescribed size and storing the data block by block, a changeover step of changing over the information source whenever one block of data is stored at the storing step, an identifying step of identifying the information source of the data that has been stored block by block, and an output step of outputting a block of data, which has been identified at the identifying step, from an information source identical with the information source for which reception of the data at the receiving step has ended.

Further according to the present invention, there is provided a printing control method for a printing apparatus connected to a plurality of information sources for printing out data transferred from the information sources comprising, a receiving step of receiving the sizes of the data from the information sources in advance and a comparison step of comparing the sizes of the data, wherein data determined to have the smallest size based upon the comparison performed at said comparison step is received and printed out.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2(*a*) and 2(*b*) is a diagram showing the internal arrangement of a reception buffer in a first embodiment;

DESCRIPTION OF THE PREFERRED EMBODIMENTS

First Embodiment

A wireless printer will be described as a first embodiment of the present invention. A wireless printer is coupled to a plurality of host computers wirelessly and prints out data sent from the host computers.

Figure 1:
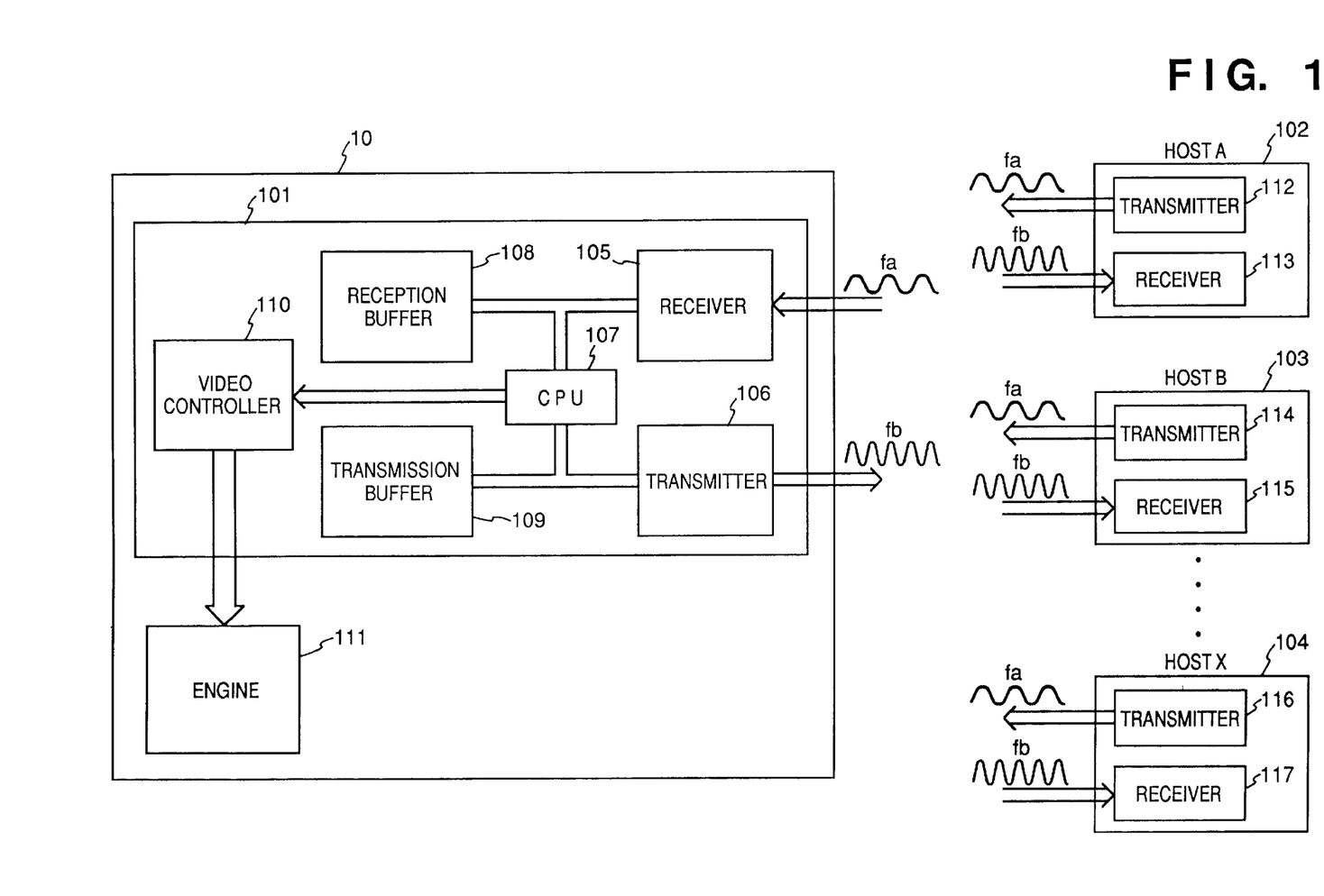
FIG. 1 is a block diagram illustrating the construction of a printing apparatus according to an embodiment of the invention.

FIG. 1 is a block diagram of the printer according to this embodiment. As shown in FIG. 1, host computers A102, B103 and X104 are connected to the same printing apparatus 10 and are capable of transferring printing data to the printing apparatus 10. The host computers A102, B103, X104 use internal transmitters 112, 114, 116 and receivers 113, 115, 117, respectively, to transmit data to be printed to the printing apparatus 10. The latter includes a printing controller 101 for controlling the overall printing apparatus 10. The printing apparatus 10 receives data from a host computer, and responds to the host computer, via a receiver 105 and transmitter 106 located within the printing controller 101. The latter further includes a reception buffer 108, which is a memory for storing data received by the receiver 105, a transmission buffer 109, which is a memory for storing transmission data to be transmitted from the transmitter 106, and a video controller 110 for converting data received from a host computer into a video signal. An engine 111 actually prints the video signal produced by the video controller 110. The printing controller is controlled by a CPU 107.

An example of operation performed by this printing apparatus will now be described with reference to FIG. 1.

The host computers A102 and B103 are connected to the same printing apparatus 10. When these two host computers transmit data to the printing apparatus 10 at substantially the same time, only the transmission data from the host computer (assumed here to be A102) whose print request has been accepted by the receiver 105 first is accepted, and this data is stored in the reception buffer 108.

Figures 2A, 2B:
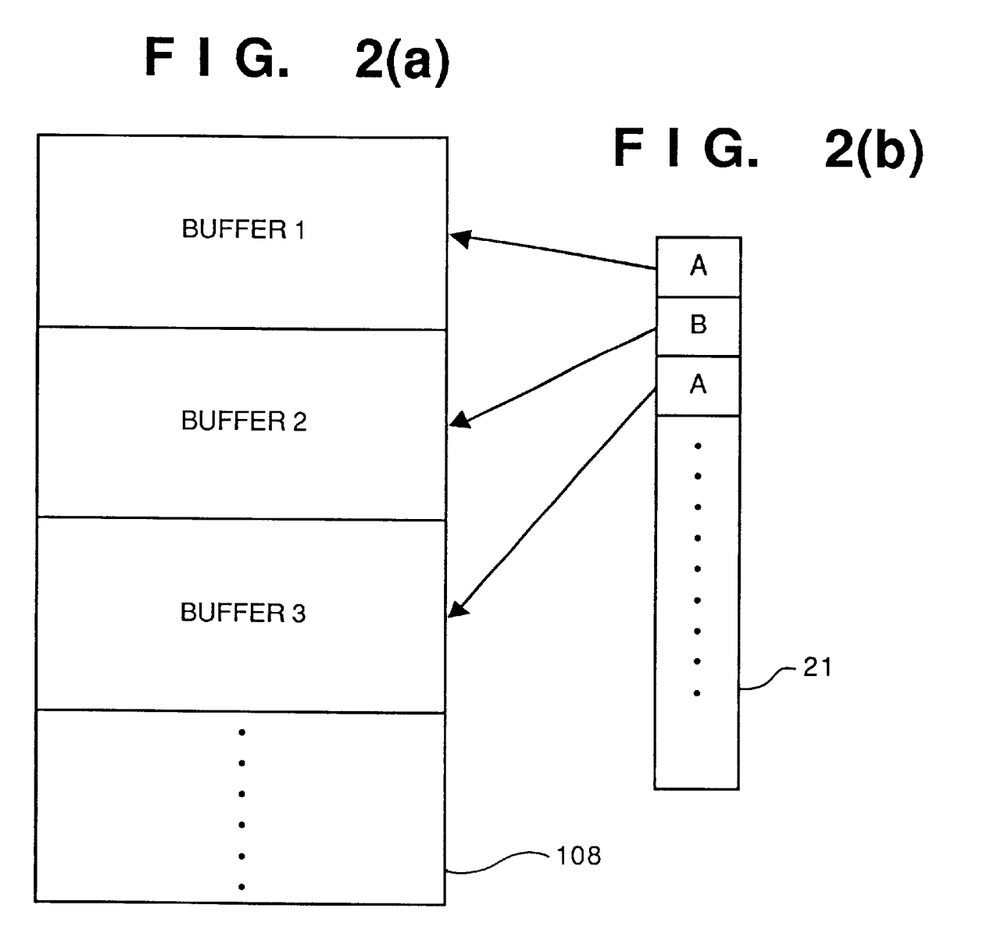

The reception buffer 108 is segmented into a plurality of small buffers (referred to as buffers 1 through m) having the same capacity, as shown in FIG. 2(a). Further, a sender memory 21 for storing the senders of data stored in each small buffer is provided. The sender memory 21 is segmented into areas the number of which is the same as that of the small buffers, and each area corresponds to a small buffer, as shown in FIG. 2(b). The sender memory 21 is provided in a memory area required so that the CPU 107 may execute a program. There are cases in which this memory is included in the CPU 107 or provided externally, although these arrangements are not shown.

First, the fact that the buffer 1 is used for host computer A is recorded in the sender memory 21. Though the ID of the host computer may be used for this purpose, the order corresponding to the buffers is required to be recorded upon taking into consideration the fact that the buffers are not used in any particular order. Thereafter, data is stored until the buffer 1 is filled to its capacity. When this operation ends, a "BUSY" signal is sent back to the host computer A102 from the transmitter 106. When this is done, the host computer A102 halts the transmission of data at this time and the printing controller 101 accepts a print request from a host computer (assumed to be host computer B103 in this case) other than host computer A102 through an operation similar to that performed when an interrupt is received. The printing controller 101 stores the data received from the host B103 in the second buffer (buffer 2) of the reception buffer 108. Of course, the fact that the buffer 2 is used by the host computer B is entered in the sender memory 21 corresponding to the buffer 2.

The reception buffer 108 is evenly segmented in such a manner that the capacities of the buffers 1 through m will be equal. Consequently, in a case where the received data from the host computer B103 ends before the small buffer 2 of the reception buffer 108 is filled, it is possible to judge that the received data from the host computer B103 is less than the received data from the host computer A102 that has been stored in the small buffer 1. In such case, therefore, the CPU 107 controls the video controller 110 in such a manner that the received data from the host computer B103 is printed before the received data from the host computer A102 accepted first.

When development of the data in the small buffer 2 into a print image for the purpose of printing the data from the host computer B103 has ended, the host computer A102 is released from the "BUSY" state as by transmission of a command. Once it has been released from the "BUSY" state, the host computer A102 resumes the transmission of print data (it is assumed here that the data transferred by the host computer A102 is a continuation of the data which prevailed at the moment the "BUSY" state was attained). The data which the printing apparatus 10 has received from the host computer A102 is stored in the small buffer 3 as a continuation of the data stored in the small buffer 1. If the transmission of data by the host computer A102 ends before the small buffer 3 is filled, the CPU 107 refers to the sender memory 21, makes an address conversion in such a manner that the small buffer 3 will follow the buffer 1, and controls the video controller 110 in such a manner that the data received from the host computer A102 and stored in the small buffers 1 and 3 is printed out.

Figure 3:
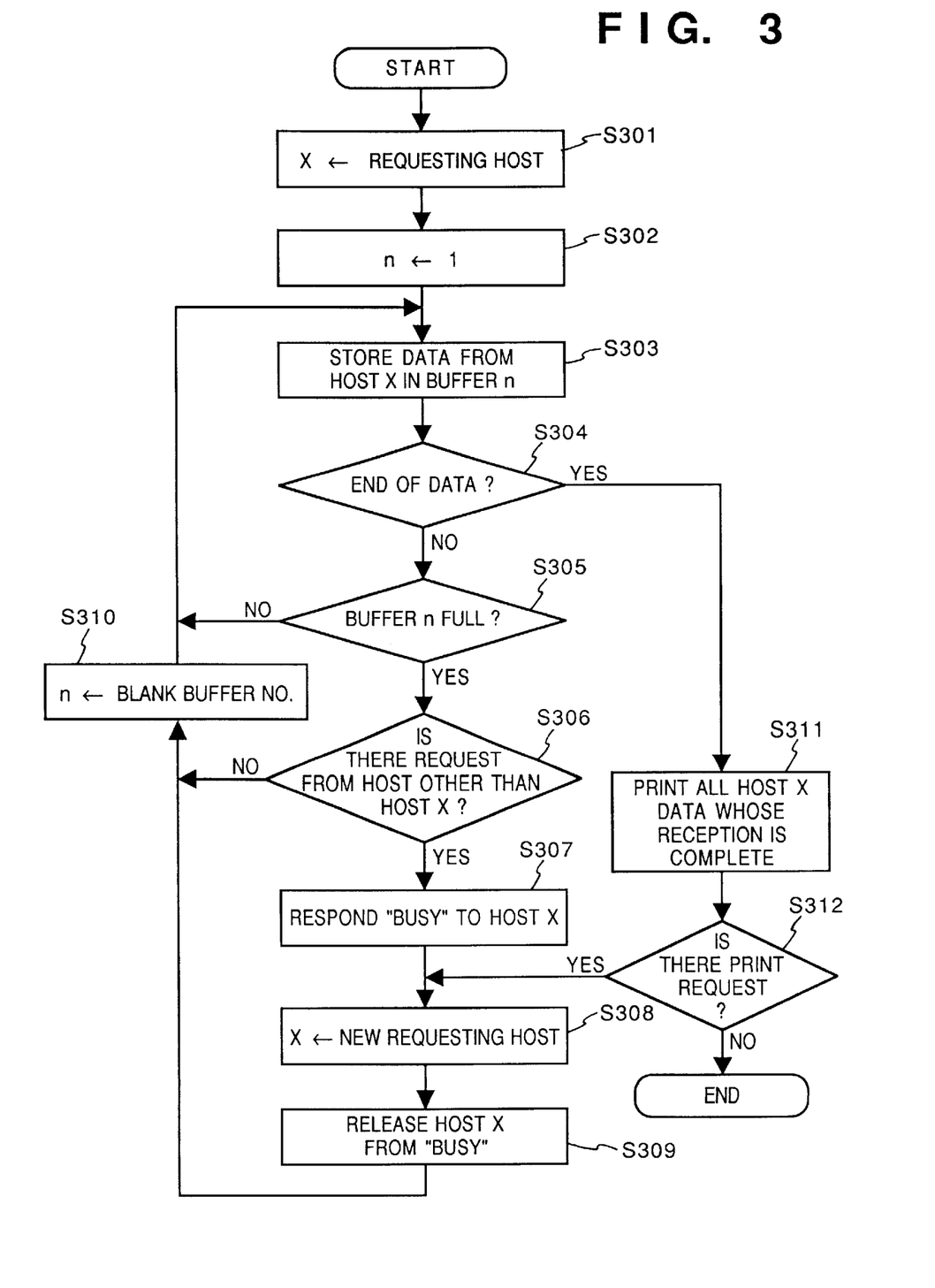
FIG. 3 is a flowchart illustrating the operation of the first embodiment.

The foregoing processing procedure will now be described with reference to the flowchart of FIG. 3. FIG. 3 illustrates the procedure of processing executed by the CPU 107 of the printing apparatus 10 connected to a plurality of host computers. The reception buffer 108 of the printing apparatus 10 is segmented into m-number of small buffers having the same capacity. The number of the buffer in use is represented by n, and the host computer in use is represented by X.

When a print request from the host computer is received in the standby state, the host ID of the host computer that has issued the request first is set to X at step S301, and 1 is set to n as the number of the small buffer at step S302.

Next, at step S303, print data is received from the host computer X and this data is stored in buffer n (which is 1 in the initial state). At this time the fact that this buffer is the first buffer for the data received from host computer X, as well as the ID of host computer X, is stored in the sender memory 21 corresponding to the buffer n. It is determined at step S304 whether the data from the host computer X has ended. If the data has not ended, then reception of the data continues until it is determined at step S305 that the buffer n has been filled to capacity. If the buffer n has been filled, it is determined at step S306 whether there is a host computer requesting printout besides the host computer X, from which data is presently being received. It should be noted that the print request mentioned here is not limited to a new request but includes also a request with regard to which data transmission has been suspended by a "BUSY" signal issued in the next step. If there is a new print request, a "BUSY" response is sent to the host computer X from which data is presently being received, and transfer of data from the host computer X is suspended at step S307.

Next, the host computer issuing the print request, which host computer was detected at step S307, is decided as a new host computer X at step S308. This is followed by step S309, at which a "BUSY cancellation" signal is sent to the new host computer to allow a data transfer from this host computer (the "BUSY cancellation" signal is assumed to be effective also with regard to host computers not in the "BUSY" state). Next, at step S310, the buffer n used in data storage is changed from one currently being used to any one which is blank.

FIG. 3 is a diagram for describing a procedure through which the printing sequence is decided. A situation in which there are no blank buffers is not taken into consideration. However, a situation in which there are no blank buffers is quite likely in an actual printing apparatus and it is necessary to deal with this situation. Accordingly, if there are no blank buffers, it is necessary to start printout immediately to produce a blank buffer.

If it is determined at step S304 that the data has ended, then reference is made to the sender memory 21 at step S311 and all of the data that has been received from the host computer from which data is currently being received is printed out in the correct order. If the data within one small buffer is finished being printed out, then this buffer can be used freely as a blank buffer.

When printout of data from one host computer ends, it is determined at step S312 whether there is another print request. This determination is identical with that performed at step S306. If there is no print request, this means that all print requests have been processed completely and therefore printing processing is terminated. If another print request is found at step S312, then reception of data is started again with X serving as the host making the request.

If a print request from a host computer other than the host computer X presently performing processing is not detected at step S306, then the next blank buffer is found and reception of data from the host computer presently performing processing is continued.

By virtue of the foregoing procedure, the order of priority of print requests that have been transferred from a plurality of host computers substantially simultaneously is decided not solely by the time at which the print requests were accepted but in dependence upon the amount of data to be printed out as well. As a result, even if a certain print request is accepted by the printing controller 101 later than another print request, the data associated with the latter print request will undergo printing processing first if the amount of this data is less than that associated with the earlier print request. Accordingly, the waiting time during data transfer can be shortened and the efficiency of overall data processing involving the host computers and printing apparatus can be improved.

Second Embodiment

In the first embodiment, the reception buffer 108 is segmented into a plurality of small buffers and the data of one host computer is stored in the first of these small buffers. When this buffer is filled to capacity, the data from the next host computer is accepted compulsorily and this data is stored in the second small buffer of the reception buffer 108. This control of data quantity is carried out based upon the fact that a small buffer has been filled to capacity. However, it is also possible to control the amount of data by reserving a required area for a host computer. A method of accomplishing this will now be described.

The host computer A102 and host computer B103 shown in FIG. 1 transmit data at substantially the same time. Written at the beginning of each mass of data is a SUM value indicating the size of the data. Upon receiving the data, the printing controller 101 reads in only the SUM values sent from the host computers and selects the smaller SUM value, namely the smaller amount of data. After the data from the host computer having the smaller SUM value is printed out first, the data from the host computer having the larger SUM value is printed. If this embodiment is adopted, the amount of memory necessary for the reception buffer can be reduced since the arrangement is not such that size of the data is known immediately upon the conclusion of actual reception, as in the first embodiment.

Figure 6:
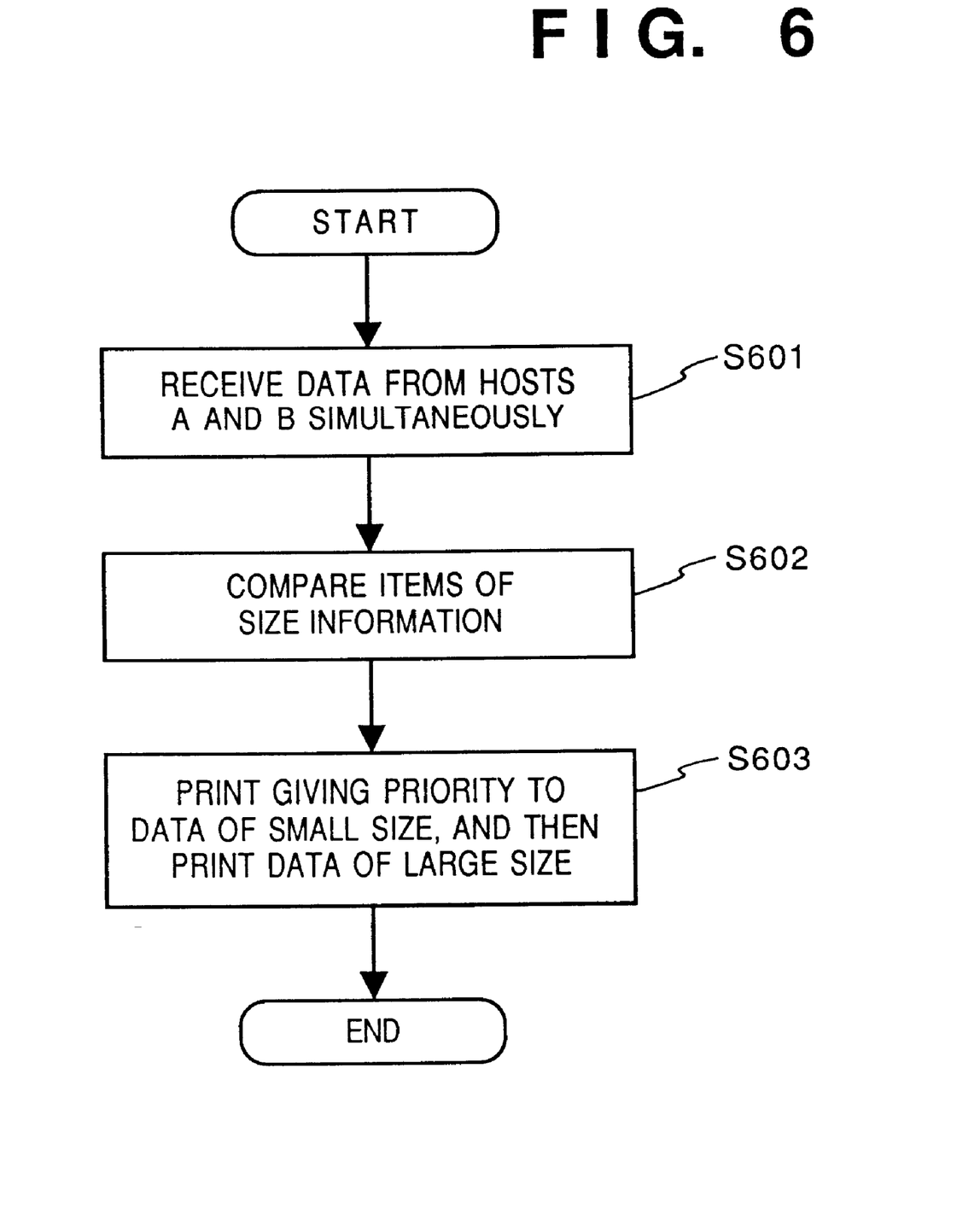
FIG. 6 is a flowchart illustrating the operation of the second embodiment.

FIG. 6 is a flowchart illustrating the procedure of printing control processing by the printing apparatus of a second embodiment. The arrangement of the apparatus in this embodiment is the same as that of the first embodiment and is illustrated in FIG. 1. In this embodiment also, information indicating the size of the data is added to the beginning of the data transmitted from the host.

First, at step S601 in FIG. 6, the printing apparatus 10 receives data substantially simultaneously from the two masses of data are compared at step S602.

Based upon the result, print-out starts from the data having the smaller size at step 603. When this print-out ends, the data having the larger size is printed out.

In this embodiment, a case is described in which data is received from two hosts. However, the number of hosts is not limited to two.

Third Embodiment

According to this embodiment, the order of priority of printing processing is decided based upon the amount of received data, just as in the first embodiment. However, the method of controlling the amount of data, which will now be described, does not rely upon dividing a buffer into a plurality of segments.

Specifically, in this embodiment, the time needed to transfer data from each host computer is measured directly, whereby the printing controller 101 is capable of ascertaining the amount of data transferred from each host computer. If more than a certain period of time is required, the CPU decides that the amount of data from this particular host computer is comparatively large, halts the storage of the data in the reception buffer, receives the data from the other host computer issuing a print request, stores this data in another area of the reception buffer and measures the time required for this transfer. A certain stipulated time is decided beforehand upon taking into consideration the initial transfer time of the data from the host computer measured first. If the second data transfer time of the host computer is shorter than the stipulated time, the data received from the second host computer is sent to a video interface and printed out. If transfer continues for a period of time longer than the stipulated time, the data of the initial host is again transferred as a continuation of the data whose transfer has already been completed, and this data is sent to the video interface and printed out.

Figure 4:
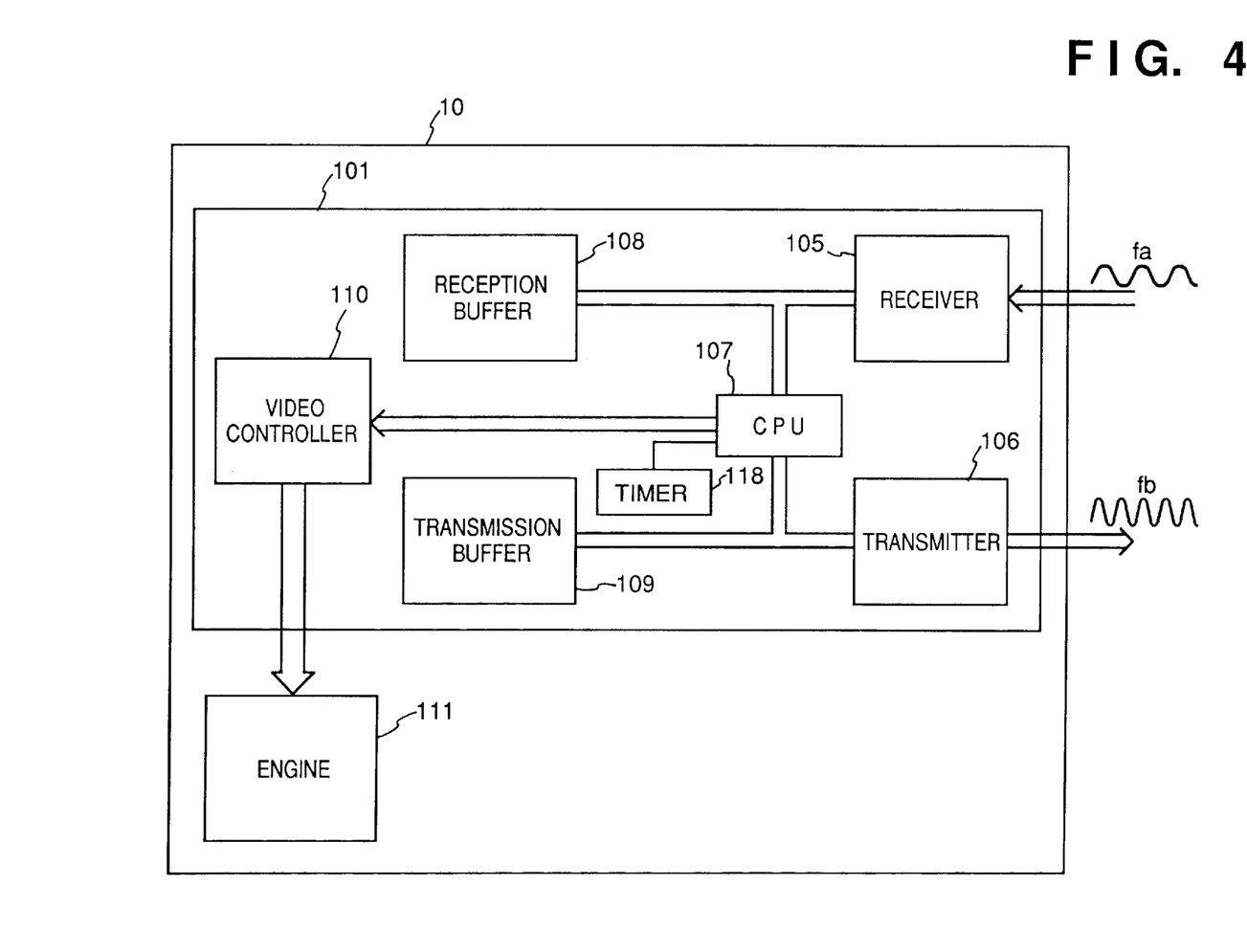
FIG. 4 is a block diagram illustrating the construction of a printing apparatus according to an embodiment of the invention.

An apparatus for practicing this embodiment may be realized by connecting a timer 118 to the CPU 107 within the printing controller 101 of FIG. 4, and using the timer 118 to measure the time needed for data transfer during reception of the data. Whereas the size of the small buffers obtained by segmenting the reception buffer is fixed in the first embodiment, in this embodiment the upper limit of the received data can be decided in a flexible manner by changing the stipulated time. As a result, a comparison of the amount of data can be performed more finely or more coarsely. If comparison is performed more finely, the order of priority of processing can be assigned based upon small differences in data quantity. If coarse comparison is adopted, overhead for changing over the host computer that is the object of processing is reduced, though order of priority cannot be assigned in fine detail.

Figure 7:
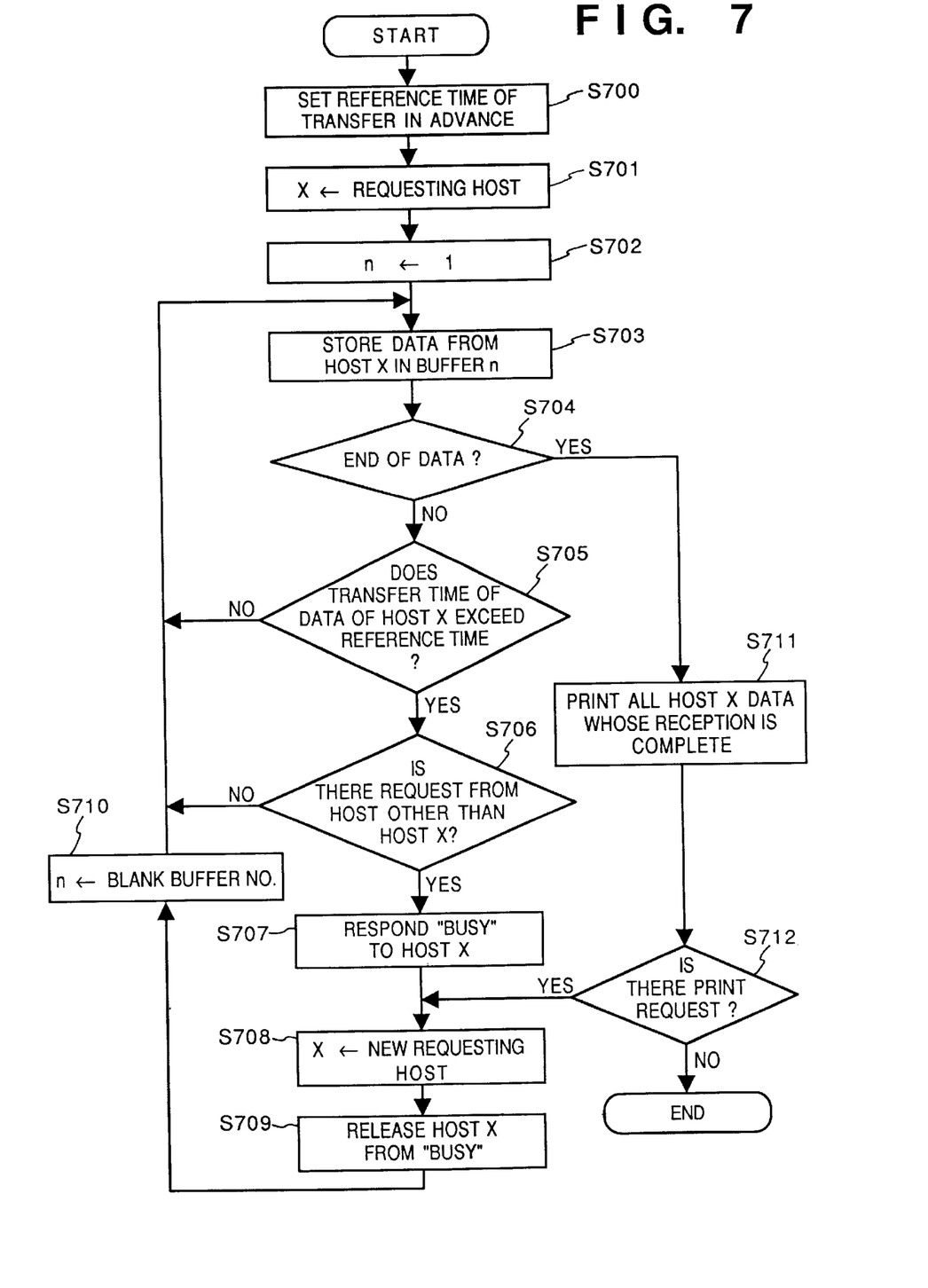
FIG. 7 is a flowchart illustrating the operation of the third embodiment.

FIG. 7 is a flowchart showing the procedure of printing control processing by the printing apparatus 10 of this embodiment. In FIG. 7, a stipulated time is decided at step S700. The stipulated time may be a value that has been stored in a memory such as a ROM (not shown) or a value inputted from the outside. The processing executed at steps S701 to S704 is the same as that executed at steps S301 to S304 in FIG. 3.

It is determined at step S704 whether the data has ended. If the data has not ended, the program proceeds to step S705, at which it is determined whether the time for transfer of the data from the host X has attained the stipulated time decided at step S700. If the decision at step S704 is "YES", the program proceeds to step S706, at which a print request from a host other that X is tested. If a "NO" answer is received at step S706, reception is continued. Thus, the meaning of step S705 is that the amount of data received from the host is judged based upon the transfer time.

The processing executed at steps S706 to S712 is the same as that executed at steps S306 to S312 in FIG. 3.

Fourth Embodiment

In the first embodiment, the order of priority in which the printing apparatus 10 outputs the data received from a plurality of information sources is controlled by a method of changing over the block of memory means in dependence upon the amount of data. However, a problem arises in such an arrangement. Specifically, if the amounts of data from, say, the host A and the host B both are somewhat large and the data is of substantially equal volume, efficiency declines rather than being improved by processing these two masses of data in parallel. In this embodiment, therefore, size information is added to the beginning of the data of each information source. In a case where the printing apparatus 10 receives data a from a certain information source A and then receives data L from the information source B, the data a is stored at the beginning of buffer 108, after which the items of size information in the data from the two information sources A and B are compared. If the result of the comparison is that data a is sufficiently larger than data b (a>>b), the printing apparatus 10 changes over the block and receives the data b of information source B. This procedure is similar to that of the first embodiment.

In other cases (b>>a, a=b), the data a continues being received without changing over the block, and the received data is stored in the next block of the buffer 108.

As mentioned above, highly efficient printing control can be carried out by changing over between the mode in which the block changeover is performed and the mode in which block changeover is not performed.

It should be noted that the comparison of the items of size information is carried out whenever each block of the buffer 108 is filled. With regard to the value a which undergoes the aforesaid comparison, the size is that obtained by subtracting the buffer capacity from the size of the original data.

Figure 5:
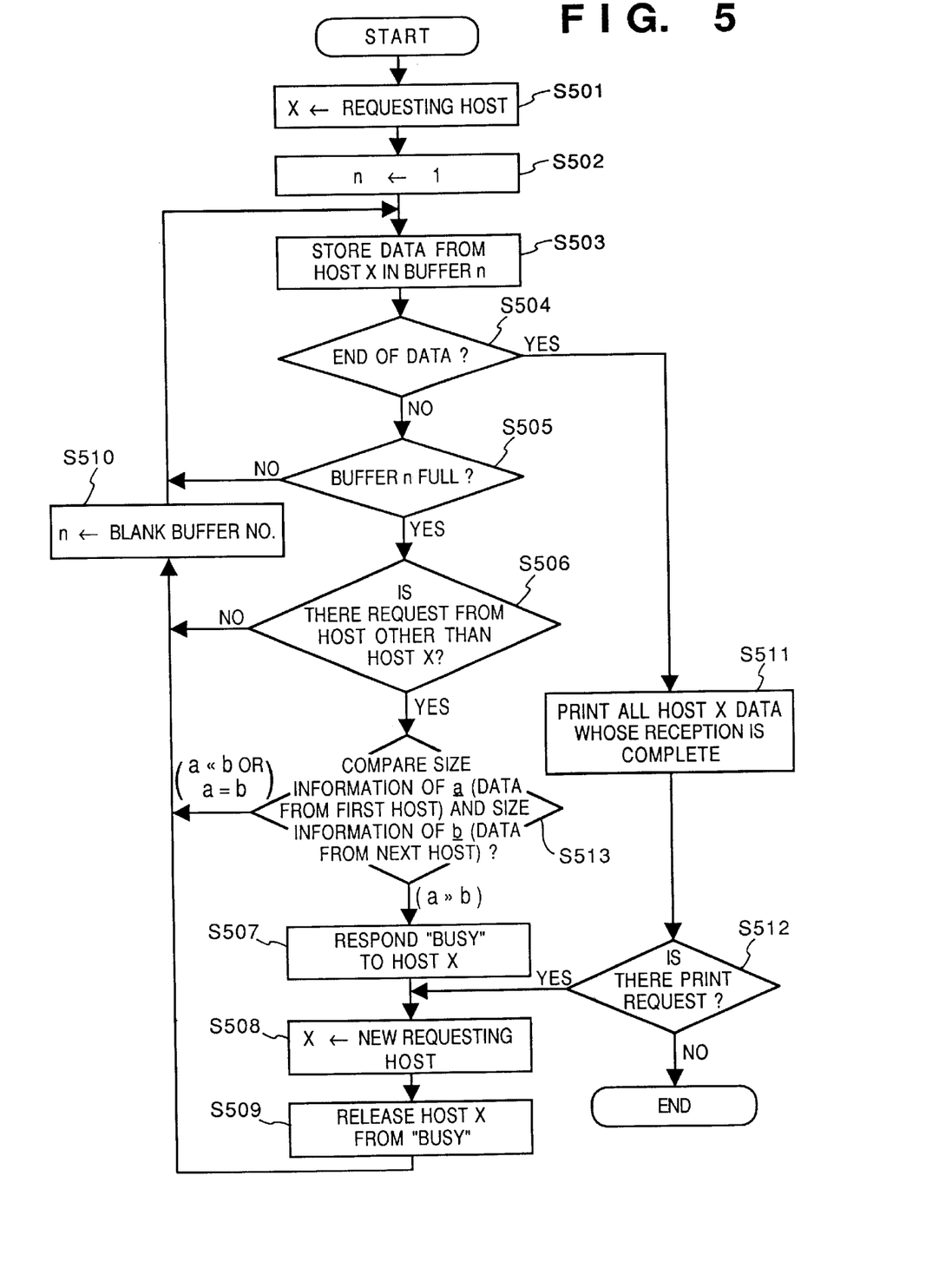
FIG. 5 is a flowchart illustrating the operation of the fourth embodiment.

FIG. 5 is a flowchart illustrating the above-described procedure. This flowchart is a procedure executed by the CPU 107 in FIG. 1.

In the flowchart of FIG. 5, steps S501 to S512 indicate processing the content of which is the same as that of steps S301–S312 in the flowchart of FIG. 3. However, if a "YES" decision is rendered at step S506 in FIG. 5, the size of data a from host A and the size of data b from host B are compared at step S513. If data a is sufficiently large in comparison with data b, "BUSY" is sent back to host X in which reception of data is presently in progress. Otherwise, reception of data from host X is continued.

It should be noted that the block changeover based on transfer time described in the third embodiment may be applied to this embodiment. In other words, in a case where print requests are received from a plurality of hosts substantially simultaneously, the amounts of output data requested are compared. As a result, if the amount of data received previously is not sufficiently larger than the amount of data that follows, the latter request is made to wait and processing of the earlier data is continued.

The four embodiments described above involve a wirelessly connected printer. However, if the printer is one connected to a plurality of hosts simultaneously, the order of priority of printing processing can be decided in the same manner even if the connection is not a wireless one.

The construction of the engine 111 in the printing apparatus of this embodiment is not particularly limited. The engine 111 may be of the electrophotographic type or of the ink-jet type.

Figure 8:
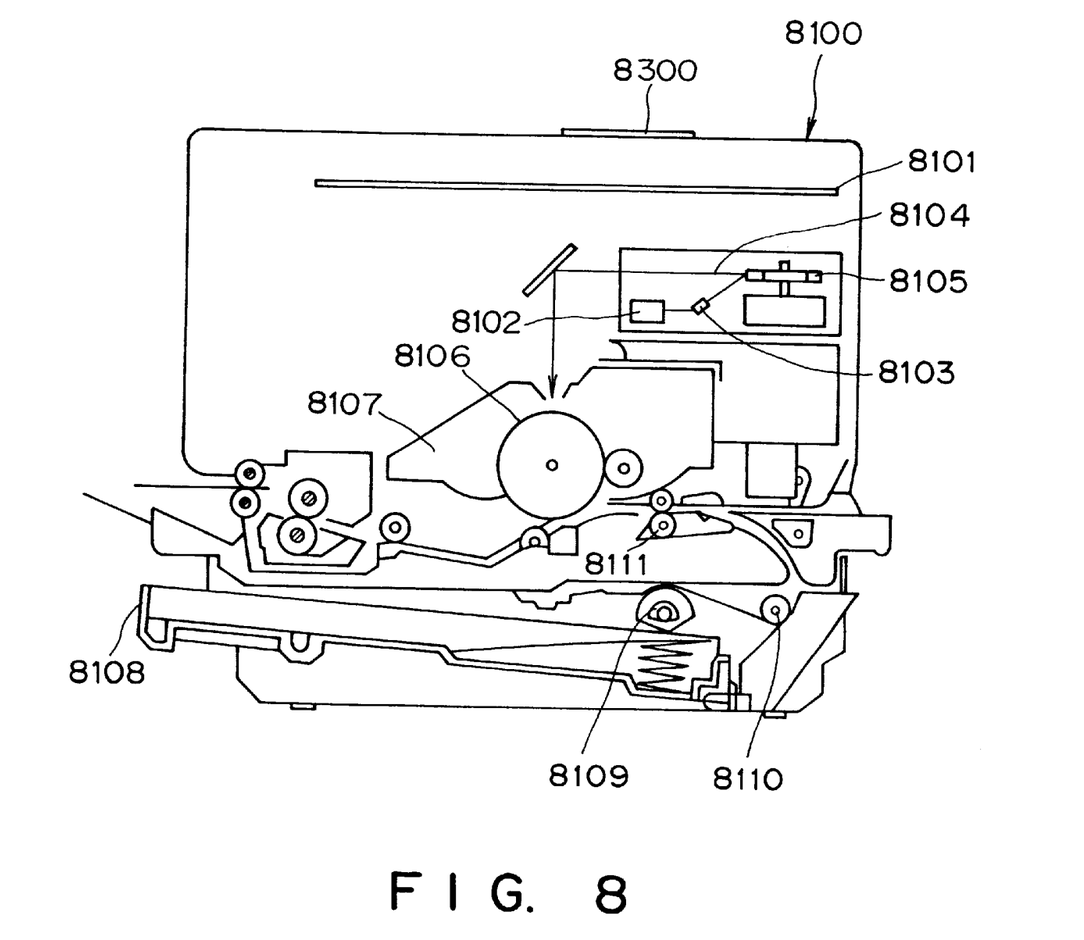
FIG. 8 is a sectional view showing a laser-beam printer.

FIG. 8 is a sectional view showing the internal structure of a laser-beam printer (hereinafter abbreviated to "LBP"), namely a printer which uses a laser beam.

This LBP can register character pattern data and form data from a data generating source (not shown) and can print images in 600 dpi resolution.

In FIG. 8, a LBP main body 8100 stores information such as character information (character code information), form information and a macro instruction from a host computer (data generating source) connected to an external device. The LBP main body 8100 forms corresponding character patterns and form patterns in accordance with the input information, and form an image on a recording sheet as a recording medium. Numeral 8300 denotes a control panel 8300 on which various operating switches and a LED (light emitting diode) display and the like are arranged.

Numeral 8101 denotes a printer control unit for performing overall control of an LBP 8100 and for analyzing data supplied from a host computer. The control unit 8101 corresponds to the printing controller 101 in FIGS. 1 and 4.

Further, the printer control unit 8101 converts mainly character information corresponding to character pattern into a video signal and outputs the signal to a laser driver 8102.

The laser driver 8102 is a circuit for driving a semiconductor laser unit 8103. The laser driver 8102 generates a laser beam 8104 by driving the semiconductor laser unit 8103. A polygon mirror 8105 rotating at a constant speed reflects the laser beam 8104 with one of the side faces so that the laser beam 8104 scans and exposes on an electrostatic drum 8106 by being swept back and forth along a perpendicular direction to a conveying direction of a recording sheet. An electrostatic latent image such as a character pattern is formed on the electrostatic drum 8106. A developing unit 8107 arranged around the electrostatic drum 8106 develops the latent image and transfer the image onto a recording sheet. The recording sheet is a cut-sheet type recording sheet set in a cassette 8108 attached to the LBP 8100. A paper feeding roller 8109, document feeding rollers 8110 and 8111 convey the sheet into the LBP 8100 and supply the sheet to the electrostatic drum 8106.

Figure 9:
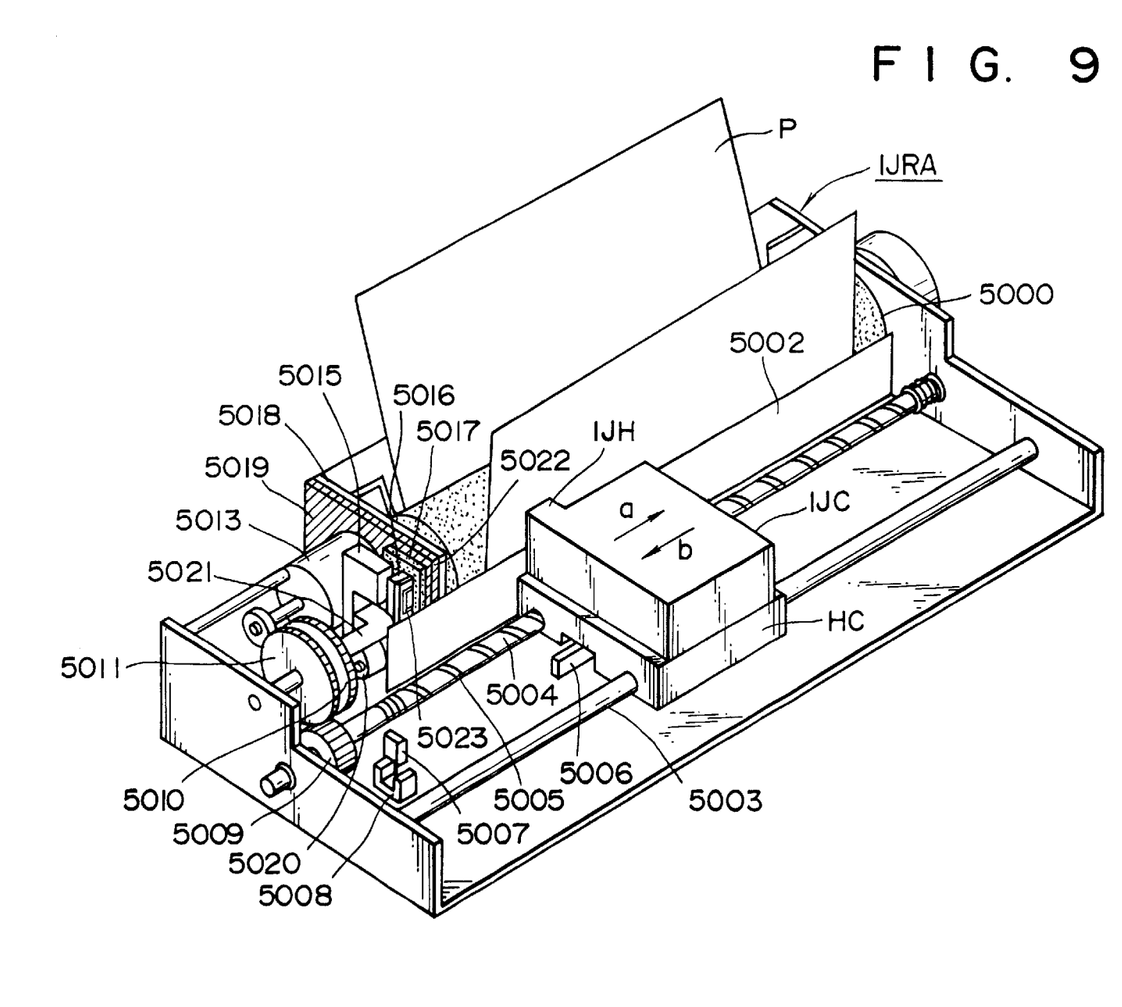
FIG. 9 is a diagram showing the structure of an ink-jet printer.

FIG. 9 illustrates an ink-jet recording apparatus IJRA. In FIG. 9, numeral 5013 denotes a driving motor. Numeral 5004 is a lead screw which rotates interlocking with the forward/reverse rotation of the driving motor 5013 via driving force transmission gears 5011 and 5009. A carriage HC having a pin (not shown) which engages with a spiral groove 5005 of the lead screw 5004 is reciprocally moved toward arrows a and b directions. An ink-jet cartridge IJC is mounted on the carriage HC. Numeral 5002 denotes a paper holder to press a recording sheet against a platen 5000 along a moving direction of the carriage HC. Numeral 5003 denotes a carriage guide. Photocouplers 5007 and 5008 are home-position detectors for recognizing a lever 5006 of the carriage HC and switching over the rotational direction of the motor 5013. A support member 5016 supports a cap member 5022 to cap the front face of an ink-jet head IJH. A suction member 5015 sucks the recording head IJH in contact with an opening 5023 in the cap member 5022 for preventing choking of the recording head with ink. A cleaning blade driving member 5019 drives a cleaning blade 5017. A main body support plate 5018 supports the cleaning blade 5017 and the cleaning blade driving member 5018. Note that a general cleaning blade can also be applied to this ink-jet printer. Numeral 5021 denotes a lever for starting the suction by the suction member 5015. The lever 5021 moves with the motion of a cam 5020 which engages with the carriage HC. The cam 5020 is driven by a driving force from the driving motor 5013 transmitted by well-known transmission means such as a switching over of a clutch.

When the carriage HC comes to the home position side area, the recording head receives desired processings of the above capping, cleaning and sucking at corresponding positions, led by the lead screw 5005.

Next, the structure of a control circuit for performing recording control of the above-described ink-jet printer will be described with reference to a block diagram of FIG. 10.

Figure 10:
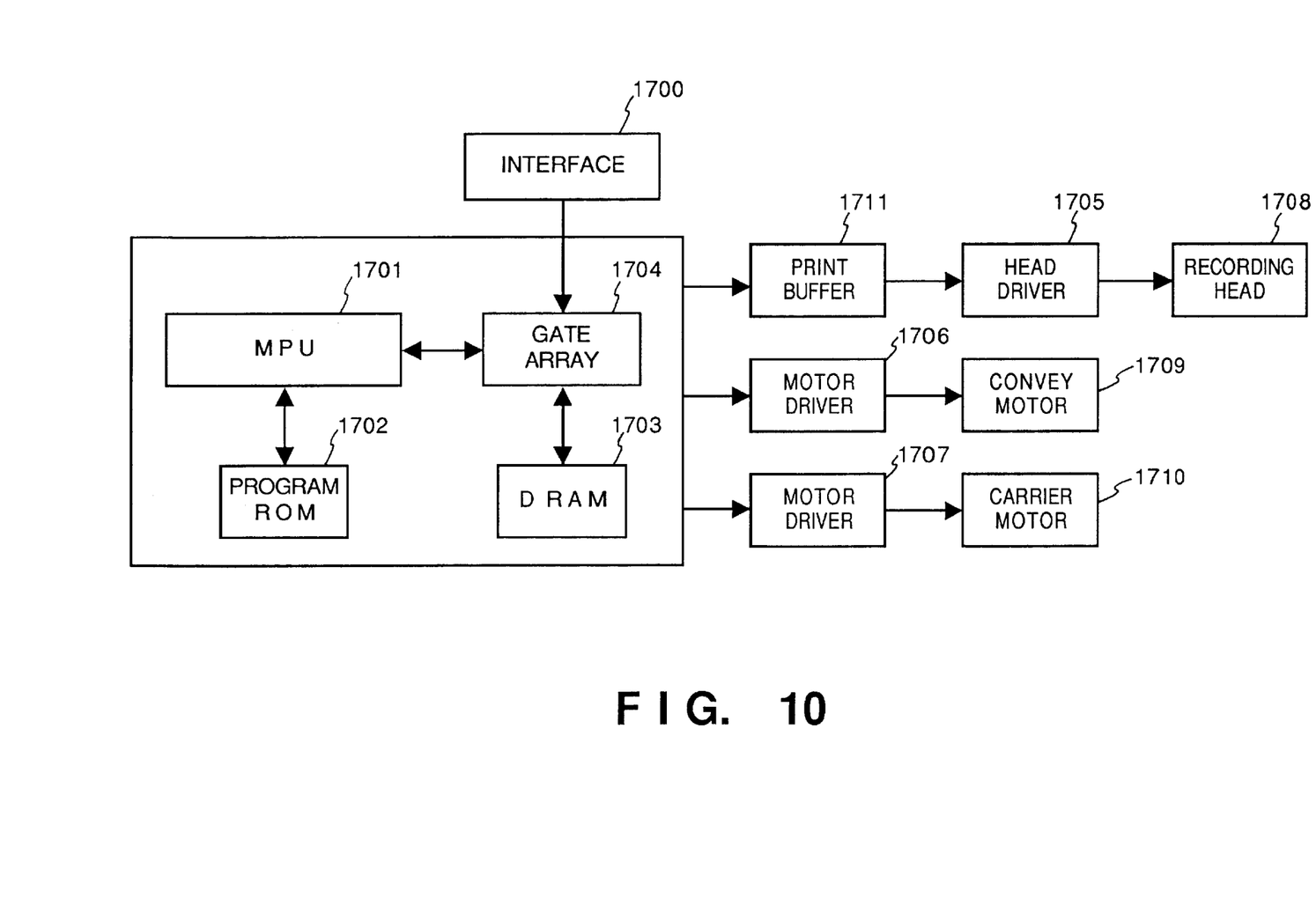
FIG. 10 is a block diagram showing the printer of FIG. 9.

In FIG. 10, numeral 1700 denotes an interface to which recording signals are input. A MPU 1701 controls the overall printer. A ROM 1702 stores control program(s) performed by the MPU 1701. A D-RAM 1703 is used as a work area of the MPU 1701 and also used for storing bit map data. A gate array 1704 controls the supply of recording data to a recording head 1708, and controls data transfer among the interface 1700, the MPU 1701 and the RAM 1703. A carrier motor 1710 carries the recording head (IJH) 1708, and a convey motor 1709 convey a recording sheet. Motor drivers 1706 and 1707 drive the carrier motor 1710 and the convey motor 1709 respectively. A print buffer 1711 stores image data to be recorded by one printing motion of the recording head 1708. A head driver 1705 drives the recording head 1708 in predetermined timing in accordance with image data in the print buffer 1711.

A recording signal entered the interface 1700 is converted into recording data for printing between the gate array 1704 and the MPU 1701, and is stored in the D-RAM 1703. The image data stored in the D-RAM 1703 are transferred at one printing motion of the recording head 1708.

In FIG. 10, an MPU 1701, a gate array 1704, a program ROM 1702 and a DRAM 1703 correspond to the printing controller 8101 in the first through fourth embodiments. The MPU 1701 executes a program that has been stored in the program ROM 1702 and executes the processing described in this embodiment.

By virtue of the mechanism of the kind described above, the data received from the host can be printed out. Of course, an engine which uses another printing method can be employed.

It should be noted that the present invention is not limited to a single apparatus but may be applied to a system composed of a plurality of apparatus so long as the functions of the present invention are implemented. It goes without saying that the present invention can be applied also to a system in which the processing is carried out by supplying a program to the apparatus or system.

The present invention is not limited to the above embodiments and various changes and modifications can be made within the spirit and scope of the present invention. Therefore, to apprise the public of the scope of the present invention, the following claims are made.

What is claimed is:

1. A printing apparatus comprising:

reception means for sequentially receiving in parallel a print request of first print data and a print request of second print data from a plurality of data sources, and receiving data sizes of the print data added to the beginning of each of the first print data and the second print data before receiving the entire print data;

output means for outputting image data based on the print data received by said reception means;

comparison means for comparing the data sizes of the first print data and the second print data received by said reception means before receiving the entire print data; and control means for (i) controlling said reception means to receive a remaining part of the second print data before receiving a remaining part of the first print data in a case where said comparison means determines that the second print data is smaller in size than the first print data, and (ii) controlling said output means to output the image data based on the second print data of which reception is completed before the image data based on the first print data.

2. A method for controlling a printing apparatus comprising steps of:

sequentially receiving in parallel a print request of first print data and a print request of second print data from a plurality of data sources and receiving data sizes of the print data added to the beginning of each of the first print data and the second print data before receiving the entire print data;

comparing the data sizes of the first print data and the second print data received in said receiving step before receiving the entire print data;

when it is determined in said comparing step that the second print data is smaller in size than the first print data, receiving a remaining part of the second print data before a remaining part of the first print data; and outputting image data based on the second print data of which reception is completed before outputting the image data based on the first print data.

3. The apparatus according to claim 1, further comprising recognition means for recognizing the data source which transmits the print data having the smallest data size based on the result of the comparison by said comparison means, wherein said control means controls said reception means to receive the entire print data from the data source recognized by said recognition means.

4. The apparatus according to claim 1, wherein, when the plurality of data sources request transmission of print data at substantially the same time, said control means controls said reception means to receive the beginning portions of the print data including the data size and determines a data source from which the print data is received first.

5. The apparatus according claim 1, wherein said printing apparatus is a print control unit including said reception means, said output means and said control means for controlling a printing engine.

6. The apparatus according to claim 1, further comprising a printing engine which performs printing based on a video signal generated from print data outputted by said output means.

7. The method according to claim 2, further comprising a step of recognizing the data source which transmits the print data having the smallest data size based on the result of comparison in said comparing step, wherein the entire print data from the data source recognized in said recognizing step is received.

8. The method according to claim 2, wherein, when the plurality of data sources request transmission of print data at substantially the same time, the beginning portions of the print data including the data size are received and a data source from which the print data is received first is determined.

9. The method according to claim 2, wherein, in said outputting step, print data is output as a video signal to a printing engine which performs printing based on the video signal.

10. A computer readable storage medium on which a program for controlling a printing apparatus is encoded, the program comprising the steps of:
    sequentially receiving in parallel a print request of first print data and a print request of second print data from a plurality of data sources and receiving data sizes of the print data added to the beginning of each of the first print data and the second print data before receiving the entire print data;
    comparing the data sizes of the first print data and the second print data received in said receiving step before receiving the entire print data;
    when it is determined in said comparing step that the second print data is smaller in size than the first print data, receiving a remaining part of the second print data before a remaining part of the first print data; and
    outputting image data based on the second print data of which reception is completed before outputting the image data based on the first print data.

11. The computer readable storage medium according to claim 10, wherein, the program further comprises a step of recognizing the data source which transmits the print data having the smallest data size based on the result of comparison in said comparing step, wherein the entire print data from the data source recognized in said recognizing step is received.

12. The computer readable storage medium according to claim 10, wherein when the plurality of data sources request transmission of print data at substantially the same time, the beginning portions of the print data including the data size are received and a data source from which the print data is received first is determined.

13. The computer readable storage medium according to claim 10, wherein, in said outputting step, print data is output as a video signal to a printing engine which performs printing based on the video signal.

14. A printing apparatus comprising:
    a receiver which is capable of receiving in parallel a print request of first print data and a print request of second print data and sequentially receiving print data in units of a predetermined amount, from a plurality of data sources, with size information of entire print data added to beginning portions of the first print data and the second print data;
    a video controller which outputs image data based on print data received by said receiver; and
    a central controller which,
        (i) when a unit of print data is received from one of the plurality of data sources, determines whether or not a request from an other one of the plurality of data sources exists,
        (ii) when it is determined that a request from the other one of the plurality of data sources exists, compares the size information for the print data added to the beginning portions of the first print data and second print data without receiving the entire print data,
        (iii) controls said receiver to receive the second print data before receiving the first print data in a case where it determines by comparison that the second print data is smaller in size than the first print data, and
        (iv) controls said video controller to output the image data based on the entire second print data of which reception is completed before the image data based on the first print data.

15. The apparatus according to claim 14, wherein said central controller recognizes the data source which transmits the print data having the smallest data size based on the result of comparison and controls said receiver to receive the entire print data from the data source recognized as a data source transmitting the print data having the smallest data size.

16. The apparatus according to claim 14, wherein, when the plurality of data sources request transmission of print data at substantially the same time, said central controller controls said receiver to receive the beginning portions of the print data including the data size and determines the data source from which the print data is received first.

17. The apparatus according to claim 14, wherein said printing apparatus is a print control unit including said receiver, said video controller and said central controller for controlling a printing engine.

18. The apparatus according to claim 14, further comprising a printing engine which performs printing based on a video signal generated from print data outputted by said video controller.

* * * * *

UNITED STATES PATENT AND TRADEMARK OFFICE
CERTIFICATE OF CORRECTION

PATENT NO.  : 6,359,698 B1  
DATED  : March 19, 2002  
INVENTOR(S)  : Tadashi Kawaguchi It is certified that error appears in the above-identified patent and that said Letters Patent is hereby corrected as shown below:

<u>Title page,</u>
Item [56], References Cited, FOREIGN PATENT DOCUMENTS,
"61196326" should read -- 61-196326 --.

<u>Column 2,</u>
Line 44, "is a diagram" should read -- are diagrams --.

<u>Column 7,</u>
Line 40, "L" should read -- <u>b</u> --.

<u>Column 8,</u>
Line 59, "transfer" should read -- transfers --.

<u>Column 9,</u>
Line 44, "convey" should read -- conveys --.

<u>Column 11,</u>
Line 43, "wherein," should read -- wherein --.

Signed and Sealed this

Eighth Day of October, 2002

Attest:

JAMES E. ROGAN
*Attesting Officer*    *Director of the United States Patent and Trademark Office*